Patented Oct. 31, 1950

2,527,829

UNITED STATES PATENT OFFICE 2,527,829

FOUNDRY ADDITIVES

Carl F. Leitten, Hamburg, N. Y., assignor to Electro Refractories & Alloys Corporation, Buffalo, N. Y.

No Drawing. Application November 12, 1948,
Serial No. 59,751

5 Claims. (Cl. 75—57)

This invention relates to additives for the production of cast iron and more particularly gray cast iron to improve in its machinability and its ability to be cast in thin sections without the production of hard, brittle, chilled areas. I accomplish my objective by the use of a compound which I prepare in briquettes and feed into the cupola in which the iron is melted for casting.

The active ingredients in my compound are finely ground silicon carbide and flake graphite. These are so compounded with other ingredients as hereinafter set forth that they become available for assimilation by droplets of molten iron at a time when the assimilation is accomplished to maximum effect.

I am aware that it has been previously proposed to utilize silicon carbide as a deoxidizer in cast iron but its use has been accompanied by the formation of silica to such an extent that the cupola slag has been seriously stiffened, often to a degree where it would not flow from the cupola properly. It has moreover been incorporated without adequately protecting the individual particles from oxidation so that they have partially burned up to silica and carbon dioxide in the upper portion of the cupola so that the silion carbide as such never reaches the zone where it can produce its full effect on the molten metal.

I am also aware that it has been proposed to use Mexican graphite as a deoxidizer. Experience has shown, however, that even when a considerable amount is added to the furnace charge, this material is not readily assimilated by the iron but rather tends to be carried off in the slag or produces objectionable inclusions in the cast metal.

In my compound, I take relatively fine ground silicon carbide and fine graphite flakes and envelop each particle in a surrounding film of porous amorphous carbon which adheres closely to the enveloped grain and protects it from oxidation until after the enveloping film itself has burned away or reacted with the reducible constituents of the slag. In order to keep the carbon-protected granules from being blown away by the rush of air through the cupola, I find it desirable to hold these granules together in a briquette by the use of a binder which will soften around 2000° F. to 2300° F. and which is capable of fluxing with the slag forming ingredients in the cupola charge. It is however important that the grains be protected by the carbon envelope and not simply embedded in the binder of the briquette as premature oxidation of the grains is thereby prevented and wetting of the grains by the droplets of molten metal is promoted, thus accelerating and insuring reaction between the two. Moreover this carbon itself seems to be peculiarly reactive and helps to initiate the assimilation of the enclosed granules by the metal. As the outer binder melts, the carbon envelope is released and brought into intimate contact with droplets of slag and of metal, permitting the enveloping film to be burned away or assimilated by the metal and leaving the fine silicon carbide and graphite in intimate contact with the droplets of molten charge. Under these conditions the silicon carbide decomposes into nascent silicon and carbon which penetrate the droplets of molten metal and react to remove traces of oxide therein. In this process the temperature of the localized zone around the reacting silicon carbide is sharply increased, increasing the solubility of the graphite in the molten metal as well as the fluidity of the metal.

I find that flake graphite is more effective than non-flake graphite, in that the flakes are more effective than other forms of carbon in raising the carbon content of the iron and seem to form seeds for the production of very thin microscopic graphite flakes in the finished metal. I find also that when seeded in this way, the graphite in the finished metal assumes what metallurgists refer to as the "A" structure in a pearlite matrix rather than tending to form rosettes or dendrites. This beneficial effect is materially greater when both silicon carbide and graphite are present than when either is present alone.

By the use of my compound the fluidity of the molten iron is improved so that thin cast pieces can be more readily produced. Moreover, the tendency to the formation of so-called chilled areas of white iron in these thin sections is greatly reduced, for example, in a certain casting made of iron containing 3.02% carbon and 1.47% silicon, the depth of the chilled area was decreased from $18/32''$ to $11/32''$ by the use of only five pounds of my material per ton of metal. The use of as much as one percent of my material substantially completely eliminates the chilled area in such castings.

It has been my experience that the use of my compound increases the carbon content of the iron to a degree which permits even low carbon steel scrap to be utilized in the cupola charge. This has been particularly helpful during the current shortage of better grade stock. The increase in the carbon and silicon content of the metal is usually about half the amount which should be theoretically possible based on composition of the briquettes. The presence of the graphite helps the carbon pick-up somewhat more in proportion than does the carbon from the silicon carbide. While this ability to raise silicon and carbon content is important, the benefits of my material are realized even more in an improved physical structure of the cast metal than in modification of the chemical composition. Its use not only results in wide dispersal of graphite in the iron in its most desirable form but also in the breaking up and dispersal in microscopic droplets of those residual oxides and sulfides which normally form hard, semi-continuous stringers which interfere with the easy machinability of the castings.

I prefer to use my material in an amount approximately one percent of the weight of the metal charged to the cupola. The use of such a percentage permits relatively low grade metal to be charged and still obtain castings of excellent strength and machinability. With better grade raw materials the addition of as little as one-quarter of one percent of my compound yields excellent castings. I find that its use results in a substantial reduction of rejects attributable to inclusions and hard spots and in some reduction of porosity. For complete elimination of pinholes, I recommend the simultaneous use of an equal weight of aluminum along with my compound.

My compound may also be used with other materials such as nickel and manganese where these latter may be desired in the finished metal to impart special properties to it. Its action is to increase the solidity and machinability of the pieces and decrease hard chilled areas no matter what other ingredients may be present.

In the production of my material, I take silicon carbide of any available grade and crush it at least as fine as fourteen mesh per inch and finer, also graphite in the form of individual flakes not larger than about twenty mesh nor smaller than one hundred mesh and mix these together with hot coal tar in the following proportions by weight: silicon carbide, 30 to 80 parts; graphite, 20 to 40 parts; tar, 15 to 25 parts. This mixture of materials is then briquetted by any of the well known methods or formed into slabs or other shapes preparatory to baking. I embed the thus formed pieces in sand or otherwise protect them from oxidation and calcine them at approximately 1400° F. until such time as the evolution of volatile stops. The enclosing layer of carbon is thus made minutely fine grained and porous so that while it protects the underlying granules from premature oxidation, it is itself extremely reactive when in contact with molten metal. The baked pieces are allowed to cool after which they are crushed to at least ten mesh per inch and finer in order to get the particles in a condition where their ingredients will be available for rapid reaction during their passage down the cupola.

I next admix with these crushed particles a sufficient amount of a fusible binder such as clay or Portland cement to enable them to be formed into briquettes. I may use, for example, 20% of a clay such as Sadler or Albany Slip Clay and 1% of core binder such as goulac. 5% of fluxes such as sodium carbonate, fluorspar and/or borax may also be added. The mixture is then moistened to the consistency of molding sand and compressed into briquettes which are then dried.

The preferred composition of my finished briquette is approximately 45% SiC, 25% Graphite (both finer than 30 mesh), 10% non-graphitic carbon and 20% of bond and fluxes. These ingredients however may be varied between the following limits depending upon the manner in which it is desired to alter the composition of the metal produced, all within the scope of my invention:

| | Per cent |
|---|---|
| Silicon carbide | 20 to 60 |
| Graphite | 10 to 50 |
| Non-graphitic carbon | 5 to 15 |
| Bond and fluxes | 10 to 30 |

The individual particles of silicon carbide and graphite should be finer than 20 mesh in order to insure prompt and complete reaction with the charge of the cupola.

The dried briquettes are usually applied by distributing them in the charge as it is loaded into the cupola. While I find it preferable to add my compound in this way directly to the charge of the cupola because the reaction of my material is more readily effected in this way, I have found that in certain instances beneficial effects can be obtained by adding my material in smaller lumps the size of chestnuts or smaller directly to the molten metal in the ladle, or the carbon-enveloped grains may be added directly to the ladle as the molten metal is being poured into it.

Having thus described the advantages of my invention and its method of application, what I claim is as follows:

1. In a foundry additive for deoxidizing the metal and increasing its carbon content, particles of silicon carbide and particles of flake graphite, said particles being enclosed in enveloping films of amorphous carbon, said particles and their enveloping films being held in a briquette by a binder which fuses at a temperature not over 2300° F. and is capable of reacting with the slag forming materials present in a cupola charge.

2. As a foundry additive for increasing the carbon content of and completely deoxidizing the metal, a briquette comprising 20 to 60% of particles of silicon carbide and 10 to 50% of particles of flake graphite, both finer than 20 mesh, an amorphous carbon envelope surrounding the particles aforementioned, and a fusible clay binder holding the enveloped particles together.

3. A foundry additive briquette for deoxidizing and increasing the carbon content of the metal, comprising approximately 45% silicon carbide and 25% flake graphite, both being finer than 30 mesh and enveloped in a film of amorphous carbon, and a fusible binder therefor which binder fuses at a temperature from 2000° to 2300° F.

4. In a foundry additive, particles of silicon carbide and of flake graphite finer than 20 mesh in each case, said particles being individually enclosed in envelopes of minutely porous amorphous carbon, the enveloped particles being admixed with a fusible binder and formed into a briquette.

5. A briquette for deoxidizing and increasing the graphitic carbon content of iron, comprising granules of silicon carbide and of flake graphite, said granules being individually enclosed by films of amorphous carbon, said enclosed granules being present in agglomerates not larger than ten mesh per inch, the agglomerates being held together by a fusible binder.

CARL F. LEITTEN.

REFERENCES CITED

The following references are of record in the file of this patent:

UNITED STATES PATENTS

| Number | Name | Date |
|---|---|---|
| 1,549,828 | Greiner | Aug. 18, 1925 |
| 2,020,171 | Brown | Nov. 5, 1935 |
| 2,222,035 | Jones | Nov. 19, 1940 |
| 2,444,424 | Brown | July 6, 1948 |

OTHER REFERENCES

Transactions of the Electrochemical Society, vol. 41, page 81. Published in 1922 by the American Chemical Society, New York.